Oct. 4, 1960          A. P. VOELKER          2,954,721
OPTICAL INSPECTION INSTRUMENT
Filed Oct. 9, 1957          2 Sheets-Sheet 1
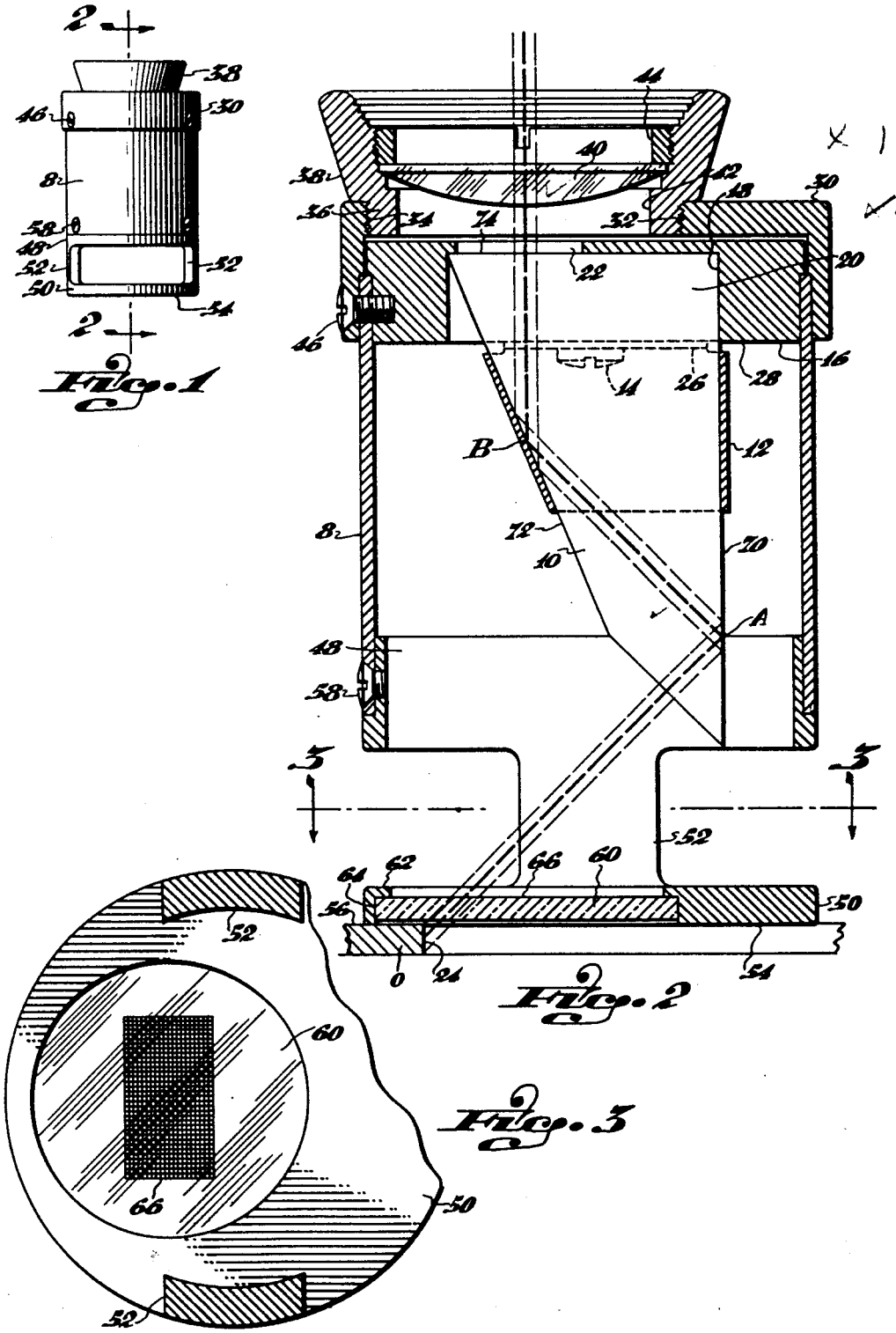

Oct. 4, 1960 A. P. VOELKER 2,954,721
OPTICAL INSPECTION INSTRUMENT
Filed Oct. 9, 1957 2 Sheets-Sheet 2

INVENTOR.
AUSTIN P. VOELKER
BY
*J. Warren Kinney, Jr.*
ATTORNEY

United States Patent Office 2,954,721
Patented Oct. 4, 1960

2,954,721

OPTICAL INSPECTION INSTRUMENT

Austin P. Voelker, 6712 Menz Lane, Cincinnati 38, Ohio

Filed Oct. 9, 1957, Ser. No. 689,076

1 Claim. (Cl. 88—14)

The present invention relates to an instrument designed to facilitate and expedite inspection of surfaces which have been pitted, etched, tooled, or otherwise processed to form minute depressions, projections, and kindred irregularities normally quite indistinct to the naked eye. To determine the condition or quality of such surfaces, it is often desirable to be able to examine, and sometimes measure, the depth of cuts, pits or depressions in the surface, and the extent or character of any minute projections or bosses upstanding amongst the depressions beneath the surface.

By way of example, and without any intention to limit the invention thereto, the present instrument might be used for measuring the height and determining the condition of projections formed by etching a lithographing plate to produce half-tone prints. The projections in the plate forming the half-tone dots are sometimes imperfect and unsuitable for sustained printing, and such a condition thereof is usually difficult to detect in advance of use. The instrument of the present invention, however, serves to facilitate and expedite examination and measurement of any such irregularities in plates or surfaces of the general character mentioned, so that rejects may be discovered and corrections made, if possible, in advance of mounting the plates upon a press. As previously noted herein, the foregoing is but one of many applications to which the invention is suited, as will become apparent in the light of further explanation.

One of the objects of the present invention is to provide an instrument whereby with great facility and convenience bosses or projections upstanding within or upon a surface may be viewed and examined, and measured, if desired, to determine their characteristics and suitability for service.

Another object is to provide an improved instrument for the purposes stated, which brings to the eye of the observer an image of a boss or projection as seen from a side angle, although the observer's line of sight is actually directed along a line which is normal to the base plane of such boss or projection.

Another object is to produce in an instrument of the character stated, an upright image free from vertical distortion, depicting the side of a boss or object upstanding upon a plat or surface which is normal to the line of sight of the observer.

A further objective is to provide an instrument so constructed as to produce a side view image of an object observed in plan, with means to obtain a true measurement of all dimensions of the object under examination.

Another object of the invention is to produce an instrument for the purposes stated, which is simple and inexpensive to manufacture, relatively small and compact as to size, and very convenient to manipulate in determining the physical characteristics and measurements of an object viewed apparently along a line which is perpendicular to the surface carrying the object under examination, but actually along a line obtuse to said surface.

The foregoing and other objects are attained by the means described herein and illustrated upon the accompanying drawings, in which:

Fig. 1 is a side elevational view of the instrument of the invention.

Fig. 2 is a greatly enlarged cross-sectional view taken on line 2—2 of Fig. 1, and showing the instrument in position for viewing a vertical face of an object.

Fig. 3 is a fragmentary cross-sectional view taken on line 3—3 of Fig. 2.

Figure 4:
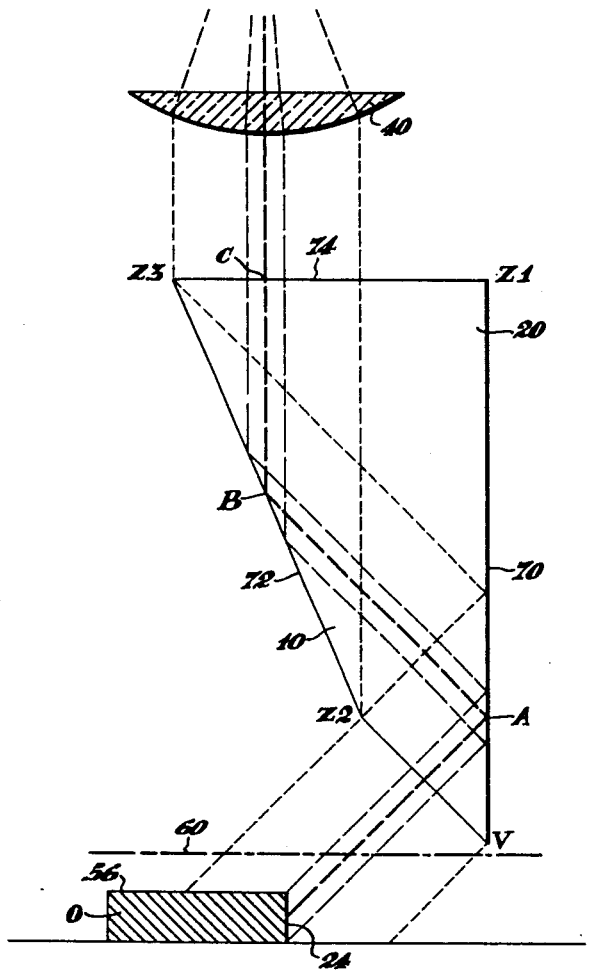
Fig. 4 is a diagrammatical view illustrating lines of reflection and refraction characterizing the optical system of the instrument.

The instrument as herein disclosed comprises a cylindrical barrel or body 8 serving as a protective housing for a quadrilateral prism indicated generally at 10. The prism may be supported or suspended within the confines of the barrel by means of a rectangular band 12 which embraces the prism sides, and which by means of one or more screws or fasteners 14, is secured to the disc-like barrel head 16. The head 16 may be recessed as at 18 to receive the butt end 20 of the prism, and at 22 may be formed a window aperture in the head through which light rays from the object face 24 may pass to the eye of the observer located above the instrument. It may be noted that the band 12 has at its upper end a horizontally directed flange 26 apertured to receive the shank of screw 14, whereby the band is secured against the underface 28 of head 16. The flange 26 and screw 14 may be duplicated at opposite sides of the band, if desired, to most effectively support the prism with relation to the head 16. The band 12 and head 16 may be considered the means for support of the prism inside the instrument barrel 8.

Enveloping the upper end of barrel 8, and overlying the head 16, is a cap 30 having a circular aperture 32 internally screw-threaded as indicated at 34, to accommodate the complementarily threaded end 36 of an eyepiece 38, which by means of the threaded connection is detachably mounted upon cap 30. The eye-piece carries a magnifying lens 40 held in concentric relation to an eye-piece aperture 42, in any suitable manner such as by means of a screw-threaded annulus 44, according to common practice. The optical center of the lens may be vertically aligned with the centers of apertures 42 and 22, as shown. Cap 30 may be fixedly secured about the barrel 8 and head 16 in any suitable manner, as by means of one or more screws 46 passing through the barrel side wall and into the material of the head.

For supporting the barrel and its prism above an object such O, an open-sided stand or base may be employed, as shown, comprising an annular upper ring 48 fitted to the lower end portion of the barrel, and a flat plate element 50 connected to the ring in spaced parallelism therewith by means of one or more upright struts 52. The connecting struts conveniently may be formed integrally with the ring 48 and plate element 50. The space between the struts, and the distance of plate 50 from the ring 48, should be quite unrestricted so as to permit external light to reach the object O and its upright face 24. The lower face 54 of the plate element should be smooth and planar, to permit gliding movement of the instrument bodily in all lateral directions upon and over the upper face 56 of object O. It should be understood that object O might be in the form of an etched or tooled plate of extensive area, which may support the entire instrument in perpendicular relationship to such plate. The instrument, therefore, may often be used by sliding it bodily upon the supporting face of the object, with plate element 50 resting thereon.

The ring portion 48 of the stand may be fixed to the lower end of barrel 8 in any acceptable manner, as by means of screws or other fasteners 58.

Associated with the support plate 50 is a glass or transparency 60, through which may be viewed the underlying object or its face 24. The glass may be in the form of a disc, as shown, suitably embedded in plate 50 to protect it from damage due to scratching by the object under examination. One acceptable form of mount for the glass 60 is illustrated by Fig. 2, wherein the plate 50 is bored and counterbored to provide a window 64 having an annular flange 62 against which the glass 60 may be cemented or otherwise secured. The thickness of the glass should be reduced as shown, so as to be located above the plane of supporting surface 54 of the plate 50. By means of this construction, the planar faces of glass 60 are furnished protection against scoring or other damage during use of the instrument.

Figure 5:
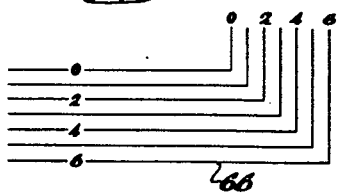
Fig. 5 is a diagrammatical view of a scale such as may be employed in the instrument for measuring or gauging purposes.

One face of the glass or transparency 60 may carry a reticle or scale 66, consisting of groups of parallel lines spaced apart as shown alternatively upon Figs. 3 and 5, for purposes of gauging or measurement of portions of the object undergoing examination. As will be explained hereinafter, the scale is not necessarily applied to the glass or transparency 60, as it may be located elsewhere in the system. However, the scale in any case should be constituted of very fine lines so characterized as not to interfere with examination of the object over which it may be placed, and the spaces between the constituent lines should be measured in units such as thousandths of an inch, or perhaps ten-thousandths, depending upon the accuracy of measurement required. Other units of measure, of course, might be applied to the scale, this being purely a matter of choice or convenience. The more open form of scale, as illustrated upon Fig. 5, is preferred in most instances.

The element 10 is preferably a quadrilateral prism possessing the quality of double reflection from the approximate points A and B, of the bundle of light rays from the object O. Rays from point B are reflected upwardly to the eye of the observer, through the magnifying lens 40, as indicated. From the disclosure of Fig. 4, it will be understood that the observer's vertically downward line of sight is angled by the prismatic reflecting surfaces at B and A, so as to bring to view the vertical face 24 of object O, in upright position and true proportion, without reversal or inversion of the image. Since the scale or reticle 66 may be placed within the line of sight, by laterally shifting the instrument, various distances and irregularities upon the image may be measured by the observer.

The prism is shaped to produce a rear planar face 70 providing an internal reflective surface which includes the point A area, and a front planar face 72 providing an internal reflective surface which includes the point B area. The internal reflective surface which includes point A may be considered the primary reflective surface, and that which includes point B may be considered the secondary reflective surface. The internal reflective surfaces mentioned may be produced by coating the prism exteriorly with an opaque substance such as paint, or the equivalent, where the bundle of light rays from the object O impinge upon the prism surfaces.

At the butt end of the prism is a transparent emitting surface 74, which is substantially at right angles to the rear planar face 70, and partly coincident with the window 22. The opposite, or light entrant end of the prism is planar and transparent, and its plane is angularly disposed relative to the other planar end 74. All cross-sections taken through the prism in planes parallel to surface 74 are rectangular.

In designing the prism, it was found that the best optical and reflective results were attained by incorporating angles substantially as follows: angle Z1—V—Z2, 45 degrees; angle V—Z2—Z3, 157.5 degrees; angle Z2—Z3—Z1, 67.5 degrees; and angle Z3—Z1—V, 90 degrees. All of the surfaces Z1V; V—Z2; and Z2—Z3 are planar. The surface Z3—Z1 may be either planar, or about −1.00D with optical center at C.

With reference to the lens at 40, this may be a simple microscope or magnifying lens as shown; or, if desired, a compound microscope may be substituted therefor. Power of magnification at the eye-piece may be provided to suit any requirements. In the interests of simplicity and low cost, very acceptable magnification may be obtained by using a single convex lens such as 40, Fig. 2, mounted with the flat face uppermost in the eye-piece. Such a lens may be of a magnifying power approximating 8- or 10-fold, with satisfactory results. Magnification may be increased very considerably by utilizing a compound lens system at the eye-piece, if desired.

As previously mentioned herein, the reticle or scale 66 may be subject to relocation within the instrument. For example, instead of locating the scale upon the glass or transparency 60 in the support plate 50, it might be applied or cut into the material of the prism within an area which includes the point of reflection A. In that event, the base or stand of the instrument might be altered to eliminate the glass 50 and its mounting means. These and various other modifications and changes in structural details of the device may be resorted to, within the scope of the appended claim, without departing from the spirit of the invention.

What is claimed is:

An optical instrument comprising, in combination, an elongate quadrilateral double reflection prism, and means for supporting the prism in upright position with its reflecting surface planes directed generally downwardly, magnifying means on the prism support means, including at least one lens, the quadrilateral prism including primary and secondary internal reflecting surfaces, a light entrant surface, and a light exit surface, the latter being in closely spaced substantial parallelism with the mean plane of the lens aforesaid, and at right angles to the primary reflecting surface, the angle between the primary reflecting surface and the light entrant surface approximating 45 degrees, the angle between said light entrant surface and the secondary reflecting surface approximating 157.5 degrees, and the angle between said secondary reflecting surface and the light exit surface approximating 67.5 degrees, and means so supporting the lens of the magnifying means, that a perpendicular line passing through the lens center and its focal point intersects the secondary reflecting surface at approximate middle area of the latter.

References Cited in the file of this patent

UNITED STATES PATENTS

| 2,048,879 | Moran | July 28, 1936 |

FOREIGN PATENTS

| 937,193 | Germany | Dec. 29, 1955 |
| 315,366 | Switzerland | Sept. 29, 1956 |
| 782,295 | Great Britain | Sept. 4, 1957 |